Patented Dec. 5, 1922.

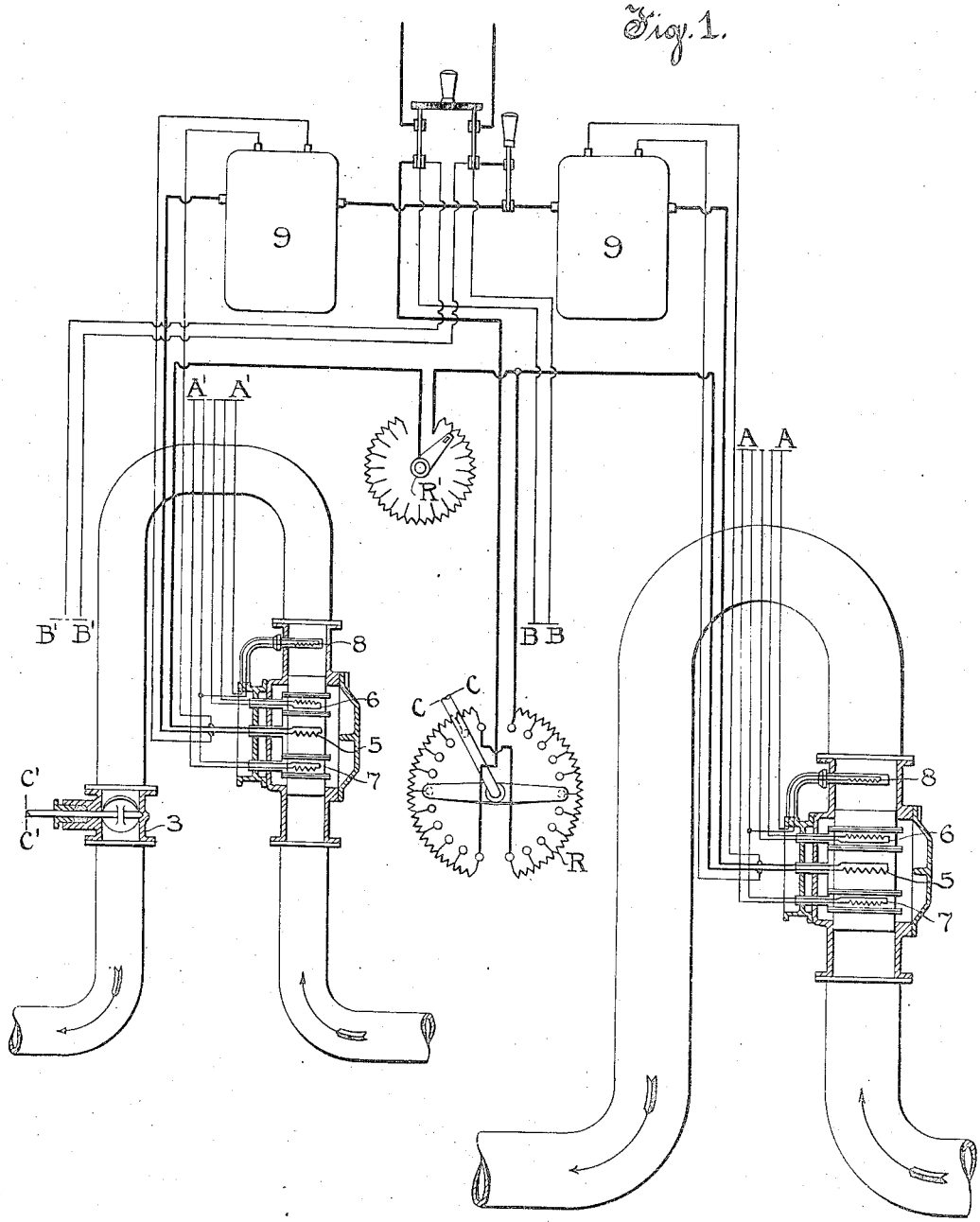

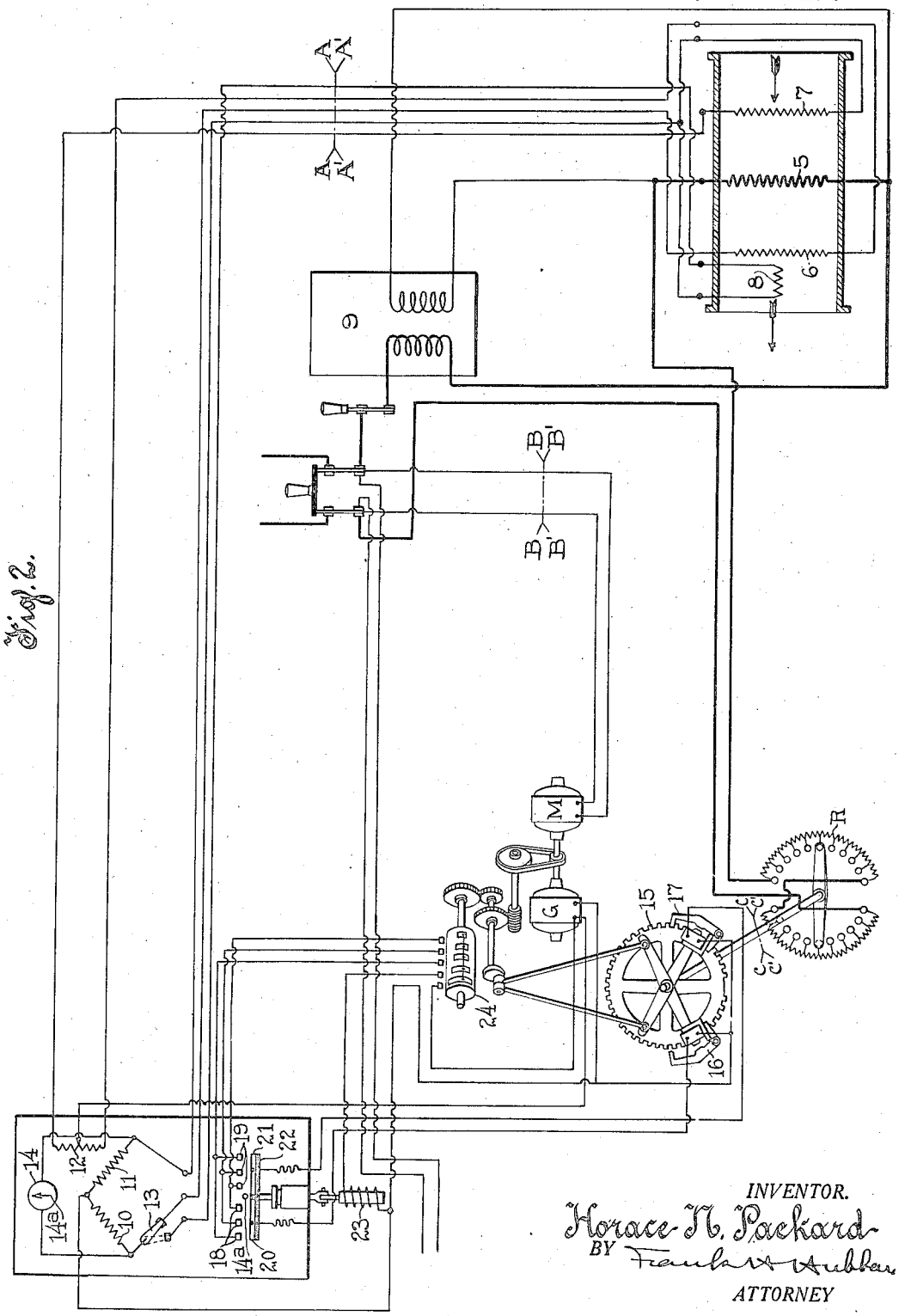

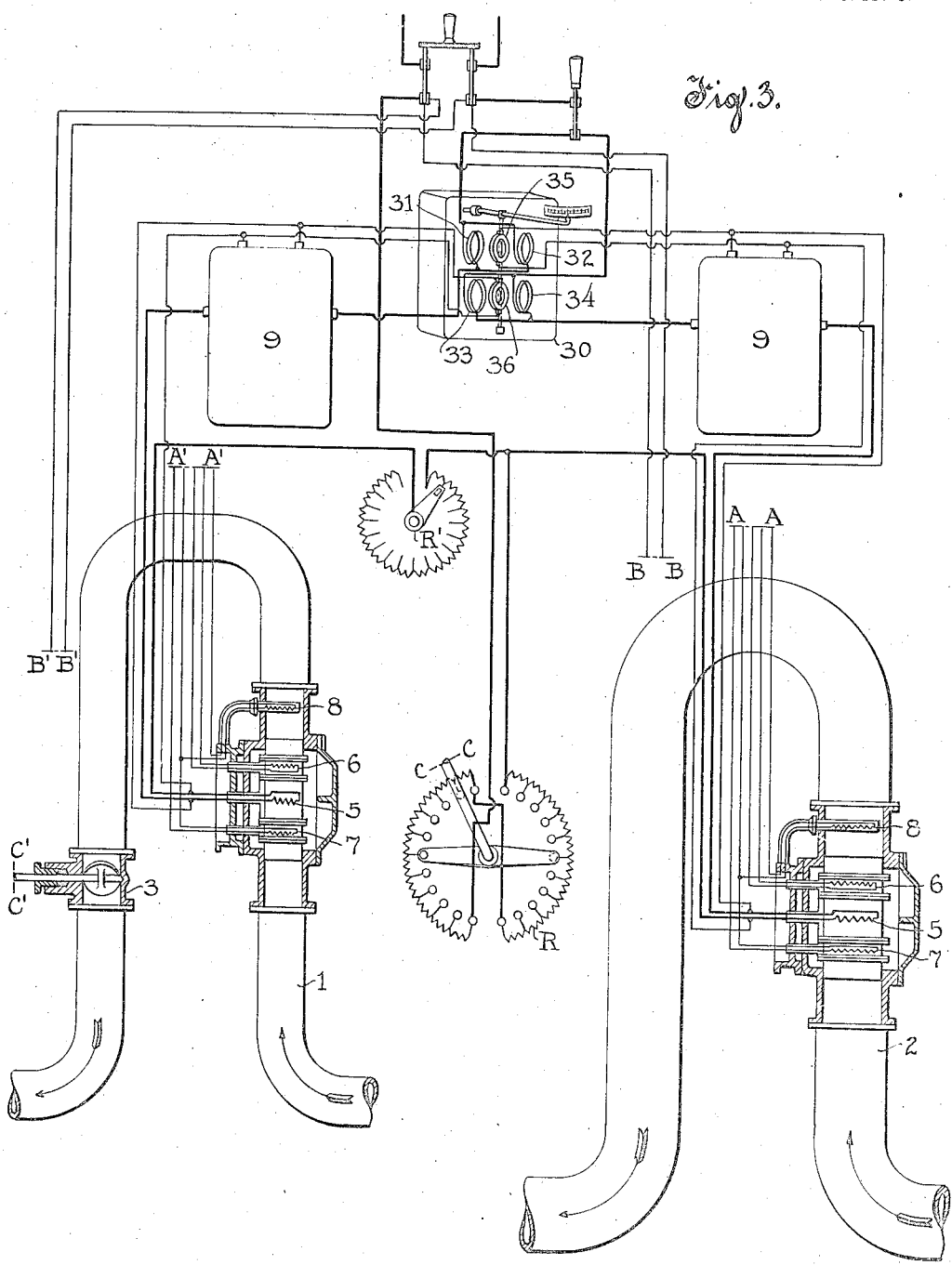

1,437,611

UNITED STATES PATENT OFFICE.

HORACE N. PACKARD, OF MILWAUKEE, WISCONSIN, ASSIGNOR TO THE CUTLER-HAMMER MFG. CO., OF MILWAUKEE, WISCONSIN, A CORPORATION OF WISCONSIN.

APPARATUS FOR PROPORTIONING FLOWING FLUIDS.

Application filed August 27, 1919. Serial No. 320,136.

*To all whom it may concern:*

Be it known that I, HORACE N. PACKARD, a citizen of the United States, residing at Milwaukee, in the county of Milwaukee and State of Wisconsin, have invented new and useful Improvements in Apparatus for Proportioning Flowing Fluids, of which the following is a full, clear, concise, and exact description, reference being had to the accompanying drawing, forming a part of this specification.

This invention relates to a method of and apparatus for proportioning flowing fluids.

In practice it is frequently desired, as in combustion and chemical processes, to supply different fluids in definite proportions and it has been attempted to regulate the flow thereof by orifice devices to obtain the desired proportioning. Such devices, however, have not proven satisfactory since with varying temperatures and pressures they give widely varying mixtures.

The present invention has among its objects to provide a method and apparatus whereby flowing fluids may be accurately proportioned and the ratio thereof maintained constant within reasonable limits.

Another object is to provide apparatus enabling the ratio of the flowing fluids to be readily ascertained at any time.

Another object is to provide apparatus enabling the ratio of the flowing fluids to be readily varied at will.

Various other objects and advantages of the invention will hereinafter appear.

According to the present invention it is proposed to measure the fluids and to regulate the flow of one according to the measurements thus obtained to maintain the flow of one fluid proportional to the flow of another. Further it is proposed to provide means for measuring the fluids substantially independently of temperature, pressure and saturation conditions and to provide means controllable by the measuring means to regulate the flow of certain of the fluids automatically.

The accompanying drawings illustrate certain embodiments of the invention which will now be described, it being understood that the invention may be embodied in other forms falling within the scope of the appended claims.

In the drawing,

Fig. 1 diagrammatically illustrates one form of apparatus;

Fig. 2 diagrammatically illustrates, in detail, the measuring means employed in Fig. 1; and Fig. 3 diagrammatically illustrates a modification of the apparatus shown in Fig. 1.

Referring to Fig. 1 the same illustrates apparatus for proportioning two streams of fluid, for example, gas and air flowing in conduits 1 and 2 respectively. Each conduit is provided with a Thomas meter for measuring the fluid flowing therethrough and the conduit 1 is provided with a butterfly valve 3 for regulating the flow of the gas under the control of the meters.

The air meter is of standard form while the gas meter is of a slightly modified form. Each of the meters comprises a heating coil 5, resistance thermometers 6 and 7 and a temperature difference coil 8 arranged within its respective conduit, each heating coil being arranged between its respective resistance thermometers. The heating coil of each meter is utilized to raise the temperature of the fluid in passing from one resistance thermometer to the other, and the rate of flow of the fluid is determined by measuring the energy input of the heating coil required to maintain a given temperature rise of the fluid, such temperature rise being determined by the temperature difference coil 8. Each meter also comprises a wattmeter 9 to measure the energy input of its heating coil.

As shown in Fig. 1 the heating coils of both meters are supplied with current through a common rheostat R, which as will appear, is automatically controlled to regulate the energy input of the heating coil of the air meter to maintain the temperature rise of the air substantially constant and also to regulate the energy input of the heating coil of the gas meter in accordance with the variations in temperature rise of the air. The variations in temperature rise of the gas are in this instance utilized to control the valve 3 and in this respect the gas meter differs from the standard meter. In addition to the rheostat R the heating coil of the gas meter has a rheostat R' in circuit therewith.

The two meters are provided with like means best illustrated in Fig. 2 for effecting automatic control of the rheostat in the one case and the valve in the other case. As shown in this figure, which discloses only the air meter, the resistance thermometers 6 and 7 and temperature difference coil 8 are connected in circuit with fixed resistances 10 and 11 and a variable resistance 12 to form a Wheatstone bridge, a switch 13 being provided to exclude the temperature difference coil when desired. The Wheatstone bridge is supplied with current from a generator G driven by a motor M and said bridge has connected therein a galvanometer 14 used to control the operation of rheostat R in the one case and the valve 3 in the other case. As shown the rheostat R is operable by the motor M through a well known mechanism including a ratchet wheel 15 and electromagnetically controlled pawls 16 and 17 co-operating with said wheel. The arrangement is such, that when the pawl 16 is attracted to engage the ratchet wheel the rheostat is driven in one direction whereas when the pawl 17 is attracted to engage the ratchet wheel the rheostat is driven in a reverse direction. The galvanometer controls the operating magnets of these pawls to effect release of both pawls when the needle of the galvanometer is in zero position and to energize said magnets selectively upon the deflection of said needle to opposite sides of zero position. For so controlling the magnets the galvanometer is provided with two series of contacts 18 and 19, to be engaged by its needle 14ª and two contact bars 20 and 21 to clamp said needle against former contacts. The contact bars 20 and 21 are carried by an insulating member 22 which is reciprocable periodically by a solenoid 23 under the control of a contact drum 24 driven by motor M. The contact drum 24 also controls the circuit connections of contacts 18 and 19 being designed to connect said contacts in circuit for graduated periods during each cycle operation of said drum.

The manner of connecting one set of the control elements to each of the meters shown in Fig. 1 will be apparent from the section lines A—A, etc., and when said elements are so connected, it will be observed that the rheostat R will be operated in response to variations in the temperature rise of the air while the valve will be operated in response to variations in the temperature rise of the gas. Accordingly, assuming the two meters to be started in the usual manner, i. e., by first balancing their respective Wheatstone bridges without heat and with their temperature difference coils excluded from the circuit and then energizing the heaters and including the temperature difference coils, the rheostat R will be operated to adjust the input of the heating coil of the air meter until the proper temperature rise of the air is obtained. At the same time the valve will be operated to regulate the flow of gas until the ratio between the flow of gas and air is the same as that between the current supplied to the gas meter and the current supplied to the air meter. Thereafter, any variation in the rate of flow of the air with a consequent variation of the energy input of the heaters will effect adjustment of the valve for proportional variations in the supply of gas, while any variations in the rate of flow of the gas will unbalance the Wheatstone bridge of the gas meter to directly effect adjustment of the valve to reduce or increase the supply of gas to maintain the desired ratio of air and gas.

On the other hand, the ratio of air and gas may be varied at will by adjustment of the rheostat R and the ratio of air and gas may be ascertained at any time by comparison of the readings of the wattmeters 9.

Referring to Fig. 3, the same shows apparatus identical with that shown in Fig. 1, but with the addition of a polyphase wattmeter 30 which is so connected that the torque produced in one of its elements by the power dissipated in one heater will balance the torque produced in the other element thereof by the power dissipated in the other heater. As shown this meter is provided with coils 31 and 32 connected in parallel in the heating circuit of the gas meter, coils 33 and 34 connected in parallel in the heating circuit of the air meter, a coil 35 connected across the circuit of the heating coil of the air meter and a coil 36 connected across the heating coil of the gas meter. Thus assuming the wattage in both meters to be alike, the above described wattmeter would show zero deflection, and would serve at all heater loads to show whether or not the desired ratio was being maintained. On the other hand, it is apparent that the wattmeter might be designed and connected to allow for any desired ratio between the meter wattages.

What I claim as new and desire to secure by Letters Patent is:

1. Apparatus for proportioning flowing fluids comprising means to regulate the flow of one fluid and control means therefor including thermo-electric means subjected to influence of variations in flow of another of such fluids per se.

2. Apparatus for proportioning flowing fluids comprising means to regulate the flow of one fluid and control means therefor including thermo-electric elements respectively subjected to influence of variations in flow of such individual fluids.

3. In combination, thermo-electric means for measuring the rate of flow of each of a number of streams of fluid and means controlled thereby for regulating one stream to maintain the flow thereof proportional to the flow of another of such streams.

4. In combination, means for measuring the rate of flow of each of a number of flowing fluids substantially independently of temperature pressure and saturation conditions and means controlled thereby for regulating the flow of one fluid to maintain the flow thereof proportional to the flow of another of such fluids.

5. In combination, thermal means for measuring the rate of flow of each of a number of streams of fluid and means controlled thereby for regulating one stream of fluid to maintain the flow thereof proportional to the flow of another of said streams.

6. In apparatus for proportioning flowing fluids, the combination with thermal measuring means for one of such fluids including an electrical heater and means to automatically vary the current supplied thereto in response to thermal changes, of thermal means for regulating the rate of flow of another of said fluids, including an electrical heater controlled by said first mentioned means to receive a supply of current proportional to that of said first mentioned heater.

7. In apparatus for proportioning flowing fluids, the combination with thermal measuring means for one of the fluids including an electrical heater subjected to variations in the current supplied thereto in response to thermal changes, of measuring and regulating means for another of such fluids including an electrical heater connected in parallel to said first mentioned heater to be subjected to the same control.

8. In apparatus for proportioning flowing fluids, in combination, means to regulate the flow of one fluid, control means therefor responsive to variations in the flow of another fluid, and means indicating the ratio of flow of such fluids.

9. In apparatus for proportioning flowing fluids, in combination, means for regulating the rate of flow of one fluid, means for measuring the flow of each of the fluids and controlling said regulating means and an instrument associated with said measuring means for indicating the ratio of flow of the fluids.

10. An apparatus for proportioning flowing fluids, in combination, means for regulating the flow of one fluid, measuring means for certain of said fluids controlling the former means to render the flow of one fluid proportional to the flow of another fluid and means adjustable to vary the flow ratio of the fluids.

11. In apparatus for proportioning flowing fluids, the combination with thermal measuring means for one of such fluids including an electrical heater and means to automatically vary the current supplied thereto in response to thermal changes, of thermal means for regulating the rate of flow of another of said fluids including an electrical heater controlled by said first mentioned means to receive a supply of current proportional to that of said first mentioned heater and means adjustable to vary the ratio of the currents supplied to said heaters.

In witness whereof, I have hereunto subscribed my name.

HORACE N. PACKARD.